United States Patent
Liu (10) Patent No.: US 11,222,273 B2
(45) Date of Patent: Jan. 11, 2022

(54) SERVICE RECOMMENDATION METHOD, APPARATUS, AND DEVICE

(71) Applicant: Advanced New Technologies Co., Ltd., Grand Cayman (KY)

(72) Inventor: Lindong Liu, Hangzhou (CN)

(73) Assignee: Advanced New Technologies Co., Ltd., George Town (KY)

( * ) Notice: Subject to any disclaimer, the term of this patent is extended or adjusted under 35 U.S.C. 154(b) by 0 days.

(21) Appl. No.: 17/157,881

(22) Filed: Jan. 25, 2021

(65) Prior Publication Data
US 2021/0174230 A1 Jun. 10, 2021

Related U.S. Application Data

(63) Continuation of application No. PCT/CN2019/099448, filed on Aug. 6, 2019.

(30) Foreign Application Priority Data

Oct. 25, 2018 (CN) .......................... 201811253440.2

(51) Int. Cl.
*G06N 5/04* (2006.01)
*G06Q 30/06* (2012.01)
*G06N 20/00* (2019.01)

(52) U.S. Cl.
CPC .............. *G06N 5/04* (2013.01); *G06N 20/00* (2019.01); *G06Q 30/0631* (2013.01)

(58) Field of Classification Search
CPC .............. G06Q 30/0631; G06Q 30/02; G06Q 30/0269; G06Q 30/0255; G06Q 50/01;
(Continued)

(56) References Cited

U.S. PATENT DOCUMENTS

2014/0136295 A1* 5/2014 Wasser ............ G06Q 10/06312
  705/7.38
2016/0253708 A1* 9/2016 Mody ............... G06Q 30/0269
  705/14.66

(Continued)

FOREIGN PATENT DOCUMENTS

CN 103617547 A * 3/2014

OTHER PUBLICATIONS

Spiess, Jeffrey, et al. Using big data to improve customer experience and business performance. Bell labs technical journal 18.4 (2014): 3-17 [online], [retrieved on Aug. 27, 2021], Retrieved from the Internet <https://ieeexplore.ieee.org/stamp/stamp.jsp?tp=& arnumber=6770344> (Year: 2014).*

*Primary Examiner* — Jerry O'Connor
*Assistant Examiner* — Michael R Koester
(74) *Attorney, Agent, or Firm* — Shun Yao; Park, Vaughun, Fleming & Dowler (57) ABSTRACT

Embodiments of the present specification provide a service recommendation method, apparatus, and device. During operation, the system obtains, based on historic information associated with a target user, a user feature and a service-usage feature of the target user for a service; determines a service recommendation scheme by inputting the user feature, the service-usage features, and a service feature of the service into a machine-learning model for recommending services; and recommends a service to the target user based on the determined service recommendation scheme.

15 Claims, 5 Drawing Sheets

(58) Field of Classification Search
CPC ... G06F 16/9535; H04N 21/4668; G06N 5/04
See application file for complete search history.

(56) References Cited

U.S. PATENT DOCUMENTS

2016/0371589 A1* 12/2016 Golbandi ........... G06Q 30/0269
2020/0106856 A1*  4/2020 Megahed ............ H04L 67/1012

* cited by examiner

SERVICE RECOMMENDATION METHOD, APPARATUS, AND DEVICE

RELATED APPLICATION

Under 35 U.S.C. § 120 and § 365(c), this application is a continuation of PCT Application No. PCT/CN2019/099448, entitled "SERVICE RECOMMENDATION METHOD, APPARATUS, AND DEVICE," by inventor Lindong Liu, filed 6 Aug. 2019, which claims priority to Chinese Patent Application No. 201811253440.2, filed on 25 Oct. 2018.

TECHNICAL FIELD

The present specification relates to the field of Internet technologies, and relates, in particular, to a service recommendation method, apparatus, and device.

BACKGROUND

With the rapid development of Internet technologies, there are more and more Internet products, bringing a lot of convenience to users. Some products such as a network cloud disk usually have free services and one or a plurality of paid services. Functional interfaces of these products usually provide paid service entrances for recommending paid services to users. Based on this, it is necessary to provide a service recommendation scheme with a higher accuracy.

SUMMARY

In order to overcome the problems in the related technologies, the present specification provides a data recommendation method, apparatus, and device.

In a first aspect, an embodiment of the present application provides a method and system for recommending services. During operation, the system obtains, based on historic information associated with a target user, a user feature and a service-usage feature of the target user for a service; determines a service recommendation scheme by inputting the user feature, the service-usage features, and a service feature of the service into a machine-learning model for recommending services; and recommends a service to the target user based on the determined service recommendation scheme.

In a variation on this embodiment, the determined service recommendation scheme comprises outputting a paid recommendation entrance on a user interface through which the target user uses the service, thereby facilitating the target user in selecting the recommended service.

In a further embodiment, the service recommendation scheme further comprises one or more of: a service type, a recommendation frequency, a recommendation time, and a location associated with the paid recommendation entrance.

In a variation on this embodiment, the service-usage feature comprises one or more of: a use time period feature, a use duration feature, a use frequency feature, a used storage space feature, and a used storage quantity feature.

In a variation on this embodiment, the service feature comprises one or more of: a storage space feature, a folder quantity feature, a function type feature, a storage quantity feature, a total storage quantity feature, a computation unit peak feature, a total computation amount feature, a network download speed feature, a network upload speed feature, a total network download amount feature, and a total network upload amount feature.

In a variation on this embodiment, the system further obtains historical data associated with a plurality of users and a plurality of services, receives feedback from the target user associated with the recommended service, and trains the machine-learning model for recommending services using the obtained historical data and the feedback as training samples.

In a variation on this embodiment, the machine-learning model for recommending services comprises one of: a logistic regression model, a random forest model, a Bayesian method model, a support vector machine model, and a neural network model.

In a second aspect according to embodiments of the present specification, a service recommendation method is provided, comprising:

acquiring the following features of a target user: a user feature, a use feature of the target user for a service, and a service feature of the service currently used by the target user;

inputting the acquired features into a recommendation scheme model, and acquiring a paid service recommendation scheme for the target user output by the recommendation scheme model; and performing paid service recommendation for the target user by using the paid service recommendation scheme.

Optionally, performing paid service recommendation for the target user comprises:

outputting a paid recommendation entrance on a page where the target user uses the service.

Optionally, the use feature comprises one or a plurality of the following:

a use time period feature, a use duration feature, a use frequency feature, a used storage space feature, or a used storage quantity feature.

Optionally, the service feature comprises one or a plurality of the following:

a storage space feature, a folder quantity feature, a function type feature, a storage quantity feature, a total storage quantity feature, a computation unit peak feature, a total computation amount feature, a network download speed feature, a network upload speed feature, a total network download amount feature, or a total network upload amount feature.

Optionally, the paid service recommendation scheme comprises one or a plurality of types of the following information: a paid service type, a recommendation frequency, a recommendation time, or a recommendation location.

In a third aspect according to the embodiments of the present specification, a service recommendation apparatus is provided, comprising:

a feature acquisition module configured to acquire a user feature of a target user and a use feature of the target user for a service;

a scheme acquisition module configured to call a recommendation scheme model by using the user feature and the use feature as inputs, and acquire a paid service recommendation scheme output by the recommendation scheme model; wherein the recommendation scheme model is obtained by training in advance using user data, historical use data of the user for services, and difference feature data of a free service and a paid service; and a recommendation module configured to perform paid service recommendation for the target user by using the paid service recommendation scheme.

Optionally, the recommendation module is specifically configured to:

output a paid recommendation entrance on a page where the target user uses the service.

Optionally, the use feature comprises one or a plurality of the following:

a use time period feature, a use duration feature, a use frequency feature, a used storage space feature, or a used storage quantity feature.

Optionally, the service feature comprises one or a plurality of the following:

a storage space feature, a folder quantity feature, a function type feature, a storage quantity feature, a total storage quantity feature, a computation unit peak feature, a total computation amount feature, a network download speed feature, a network upload speed feature, a total network download amount feature, or a total network upload amount feature.

Optionally, the paid service recommendation scheme comprises one or a plurality of types of the following information: a paid service type, a recommendation frequency, a recommendation time, or a recommendation location.

In the fourth aspect according to the embodiments of the present specification, a service recommendation device is provided, comprising a memory, a processor, and a computer program stored in the memory and executable by the processor, wherein the processor executes the program to implement the following method:

acquiring the following features of a target user: a user feature, a use feature of the target user for a service, and a service feature of the service currently used by the target user;

inputting the acquired features into a recommendation scheme model, and acquiring a paid service recommendation scheme for the target user output by the recommendation scheme model; and performing paid service recommendation for the target user by using the paid service recommendation scheme.

The technical schemes provided by the embodiments of the present specification may include the following beneficial effects:

In the embodiments of the present specification, a recommendation scheme model may be pre-configured, and by acquiring a user feature of a target user, a use feature of the target user for a service, and a service feature of the service currently used by the target user, a paid service recommendation scheme for the target user can be output; therefore, a paid service that meets requirements of the target user can be input to implement dynamic recommendation of the paid service, and the recommendation accuracy is high.

It should be understood that the above general description and the following detailed description are only exemplary and explanatory, and should not limit the present specification.

BRIEF DESCRIPTION OF THE DRAWINGS

Accompanying drawings here, showing the embodiments conforming to the present specification, are incorporated into the specification and constitute a part of the present specification, and are used to explain principles of the present specification together with the specification.

DETAILED DESCRIPTION

Here, exemplary embodiments will be described in detail, and examples thereof are shown in the accompanying drawings. When the following description involves the accompanying drawings, the same numbers in different accompanying drawings indicate the same or similar elements, unless otherwise indicated. The implementations described in the following exemplary embodiments do not represent all implementations consistent with the present specification. In contrast, they are merely examples of apparatuses and methods consistent with some aspects of the present specification as detailed in the appended claims.

Terms used in the present specification are only for the purpose of describing specific embodiments, and are not intended to limit the present specification. The singular forms "a," "the," and "said" used in the present specification and appended claims are also intended to include plural forms, unless the context clearly indicates other meanings. It should also be understood that the term "and/or" used herein refers to and includes any or all possible combinations of one or a plurality of associated listed items.

It should be understood that although terms such as first, second, and third may be used in the present specification to describe various types of information, the information should not be limited to these terms. These terms are only used to distinguish the same type of information from each other. For example, without departing from the scope of the present specification, the first information may also be referred to as second information, and similarly, the second information may also be referred to as first information. Depending on the context, for example, the word "if" as used here may be interpreted as "when" or "at the moment that . . . " or "in response to determination."

At present, types of Internet products and services provided are increasingly diversified. Taking network cloud disk products as an example, such products usually have free services and one or a plurality of paid services, and users can select services that suit their own needs. Such products may recommend paid services to users. An idea of implementing service recommendation is providing a fixed paid service entrance in a functional interface of a product. This manner may be ignored by users, resulting in a poor service recommendation effect and low recommendation accuracy.

Figure 1:
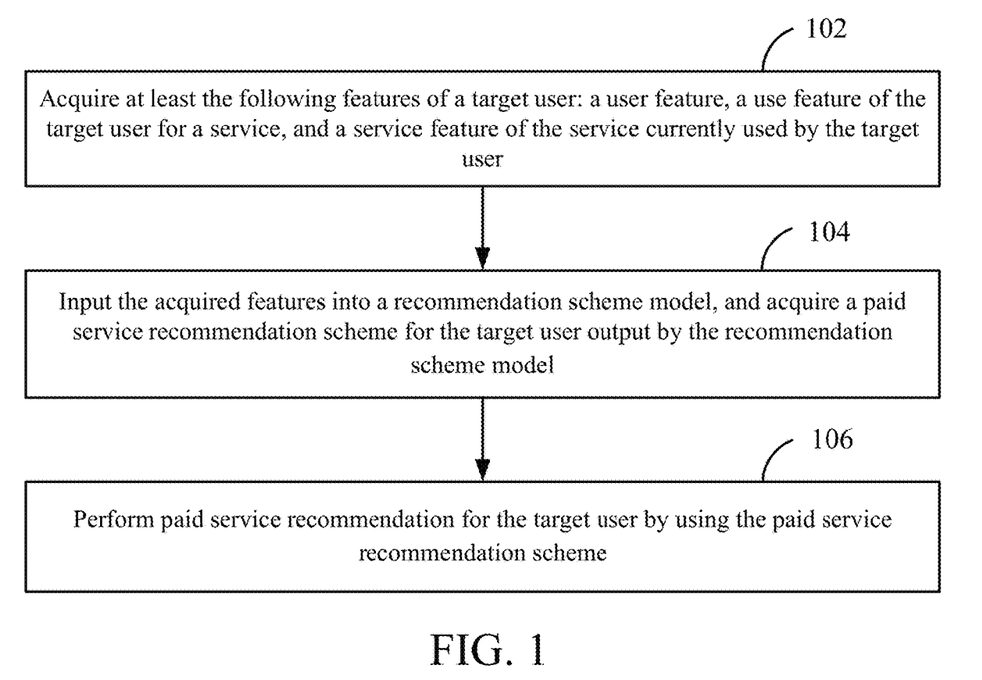
FIG. 1 is a flowchart of a service recommendation method shown according to an exemplary embodiment of the present specification.

The embodiments of the present specification provide a service recommendation method, and a paid service can be accurately recommended to a user according to the method. Referring to FIG. 1, part of the process of the method may include the following steps:

In step 102, the following features of a target user are acquired: a user feature, a use feature of the target user for a service, and a service feature of the service currently used by the target user. The use feature can also be referred to as a service-usage feature, which indicates the characteristics of the usage pattern (e.g., duration, frequency, particular time period, amount of storage space being used, etc.) of the user of a particular service.

In step 104, the acquired features are input into a recommendation scheme model, and a paid service recommendation scheme for the target user output by the recommendation scheme model is acquired.

In step 106, paid service recommendation is performed on the target user by using the paid service recommendation scheme.

In the method of the embodiment of the present specification, a servicer of an Internet product may provide a client to users. In some examples, the method of the embodiment of the present specification can be applied to the client, and the client acquires the paid service recommendation scheme and performs recommendation. In other examples, it may also be applied to a server corresponding to the client. After the user logs in to the server by using the client, the server acquires the paid service recommendation scheme and performs recommendation by using the client.

In the embodiment of the present application, a recommendation scheme model may be pre-trained, and the recommendation scheme model may be pre-set in the client or set in the server. In some examples, the recommendation scheme model may be pre-trained by the servicer (i.e., the provider of the service), and the trained recommendation scheme model may be configured in the client for service recommendation. For example, when service recommendation is required, the server can acquire the paid service recommendation scheme and then return it to the client, and the service recommendation is performed by using the client. Or, the client can directly acquire the paid service recommendation scheme by using the recommendation scheme model, and directly perform paid service recommendation in the present client.

Next, the recommendation scheme model is described. In the present embodiment, the servicer may prepare sample data used for training in advance. The sample data includes at least user data, historical use data of users for services, and feature data of various types of services.

Wherein, the user data may indicate personal information, registration information, identity information, or the like of users. For example, a user may be required to fill in registration information after the user registers for an account, and the user data may be acquired based on the data submitted after the user fills in the registration information, or the user data may be acquired continuously in the process of the user using the service.

The historical use data of users for services may be collected through the client. For example, the client may collect, within a certain period of time, use data generated by a plurality of users in the process of using services at the client, and the client may send the collected use data to the server. The historical use data of users for services here includes use data of the users for free services and use data for various types of paid services. Specifically, the use data may include one or a plurality of types of the following data: use time period data, use duration data, use frequency data, used storage space data, used storage quantity data, or the like. Acquiring the historical use data may be used for a plurality of purposes, such as determining use habits of users for services, determining characteristics of users who use free services, determining characteristics of usages of the paid services, determining characteristics of users who transition from using free services to paid services, and the like. For example, the historical use data can be used to determine that most users may transition from a free service to a corresponding paid service when the amount of used storage approaching the capacity of the free service. Such information can be important in determining the timing for recommending the paid service.

In the present embodiment, service data of free services and service data of paid services may also be acquired to determine the difference between the free service and the paid service. In practical applications, it can be flexibly configured according to the applied scenario, and the service data can be configured by the technical staff of the service provider. Taking the network cloud disk as an example, the service data of free services and the service data of paid services may include storage space difference data, folder quantity difference data, function type difference data, storage quantity difference data, and total storage quantity difference data, computation unit peak value difference data, total computation amount difference data, network download speed difference data, network upload speed difference data, total network download amount difference data, or total network upload amount difference data.

Generally, the sample data needs to reach a certain quantity to ensure the accuracy of the trained model, and more sample data may result in a higher accuracy of the model. On the other hand, when the recommendation scheme model is trained and applied, the recommendation scheme model can be used to acquire a paid service recommendation scheme of the target user to perform recommendation. The client can acquire a feedback result (such as whether to select the recommended paid service) of the target user after the recommendation. Additional user feedback (e.g., in form of a user survey) may also be collected. For example, the users may provide feedback on the likelihood that they choose the recommended paid services. After the model is put into application, the feedback result and other user data received by the client may also be used as samples, thus implementing continuous training and optimization of the recommendation scheme model.

After the above sample data is prepared, the recommendation scheme model can be obtained by training a machine learning model using the sample data. In the training process, training a suitable model with a high accuracy needs to depend on feature selection and model selection. Wherein, the machine learning model may include a logistic regression model, a random forest model, a Bayesian method model, a support vector machine model, a neural network model, or the like. The model selection affects the accuracy of a final recognition model obtained by training. Therefore, a variety of models can be selected for training in the actual application. The training process is relatively time-consuming, and requires complex iterations, and constant trial-and-error and repetition.

Another aspect of the training process is the selection of appropriate features. The features determined in the present embodiment may include the user feature, the use feature of the target user for the service, and the service feature of the service currently used by the target user.

Specifically, the user feature may include: a personal feature, identity feature, or the like of the user, such as age, gender, education level, profession, industry, work unit, whether the work unit is an enterprise user, or the like. The above user feature may indicate a preference or requirement of the user for a paid service, and therefore the preference or requirement of the user for a paid service can be determined through the user feature. For example, a user of a certain profession may need to use a larger storage space and have a greater preference for a paid service; or, an older user may have less preference for a paid service, etc. The user feature can be used to predict, to a certain extent, the preference or requirement of the user for a paid service.

The use feature includes one or a plurality of the following: a use time period feature, a use duration feature, a use frequency feature, a used storage space feature, or a used storage quantity feature. The above use feature may be determined by the client or server by continuously collecting data of the user using the service. The above use feature may also indicate a requirement of a user for a paid service. For example, a user with a higher use frequency is more likely to require various types of paid services, a user who uses more storage space is more likely to require upgrading paid services, and the like. The user feature can be used to predict, to a certain extent, the preference or requirement of the user for a paid service.

In the present embodiment, the service feature of the service currently used by the target user includes one or a plurality of the following: a storage space feature, a folder quantity feature, a function type feature, a storage quantity feature, a total storage quantity feature, a computation unit peak feature, a total computation amount feature, a network download speed feature, a network upload speed feature, a total network download amount feature, or a total network upload amount feature.

Through the above method, the service provider prepares the sample data, selects the target feature and model, and then pre-trains the recommendation scheme model. After the training of the recommendation scheme model is completed, the recommendation scheme model may be configured in an electronic device or it may also be configured in the server, and the paid service recommendation scheme of the target user can be acquired when needed.

The specific process of acquiring a paid service recommendation scheme may be acquiring the user feature of the target user and the use feature of the target user for the service and inputting them into the recommendation scheme model, and using the model to output a paid service recommendation scheme matching the target user. It can be understood that the type of features input when acquiring the paid service recommendation scheme may be roughly the same as the type of features used in the training process. Optionally, the paid service recommendation scheme includes one or a plurality of types of the following information: a paid service type, a recommendation frequency, a recommendation time, or a recommendation location. Wherein, the paid service type in the paid service recommendation scheme indicates one or a plurality of several types of paid services provided by the service provider; the recommendation frequency indicates a frequency of recommending the paid service scheme, for example, recommending once every time the user opens a page, or recommending once a day, or recommending once after a certain time interval, or the like; the recommendation time indicates a time period or moment when the paid service scheme is recommended to the user, and the recommendation time may be a time that does not affect the user using of the service, etc.; and the recommendation location may be one or a plurality of pages among several pages provided by the service provider, or it may also be a specific location of a specific page, such that the user can check the paid service recommendation scheme in time. With the above information, service recommendation can be performed dynamically. For example, a paid recommendation entrance can be output on the page (e.g., a webpage or a page of a mobile application) where the target user uses the service, such that the recommended paid service meets the preference and requirement of the user. Here the term "page" refers to a user interface (which can be a webpage or a mobile application user interface) through which the target user uses the service. The entrance can be a button or icon that can be clicked or tapped. In one embodiment, clicking or tapping such icon can cause the user interface to display information associated with the paid service.

Figure 2:
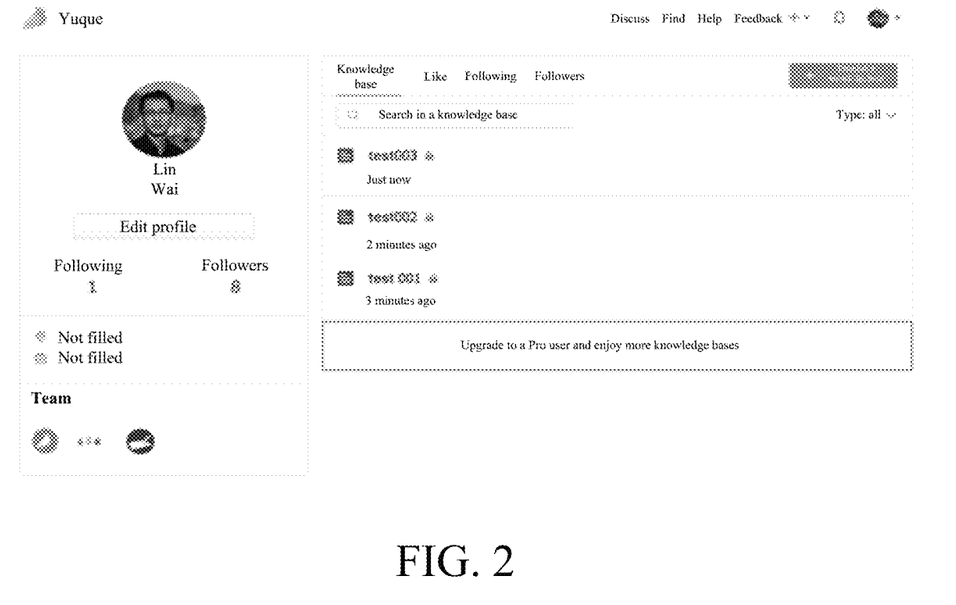
FIG. 2 is an application scenario diagram of a method shown according to an exemplary embodiment of the present specification.

As shown in FIG. 2, a schematic diagram of an interface for service recommendation according to an exemplary embodiment of the present specification is shown. In FIG. 2, a knowledge base service product is used as an example, the product provides a user with services such as a network cloud disk and file sharing, and the user can upload files and store them in a network storage space provided by the service provider. The knowledge base service product can apply the service recommendation scheme of the present embodiment. In the process of the user using the service, by a user feature, a use feature of a target user for a service (such as the current size of a storage space that has been used by the user, the quantity of uploaded files, or the quantity of established folders), and a service feature of the service currently used by the target user (such as the user currently using a free service), then inputting the acquired features into a recommendation scheme model, a paid service recommendation scheme for the target user output by the recommendation scheme model is acquired, and by using the paid service recommendation scheme, a paid recommendation entrance may be dynamically output on a page where the target user uses the service. Specifically, a paid recommendation entrance in the embodiment shown in FIG. 2 is a rectangular box of "Upgrade to a Pro user and enjoy more knowledge bases," and the user can trigger the paid recommendation entrance to enter a paid service purchase page.

As can be seen from the above embodiment, in the present embodiment, a recommendation scheme model may be pre-configured, and by acquiring a user feature of a target user, a use feature of the target user for a service, and a service feature of the service currently used by the target user, a paid service recommendation scheme for the target user can be output; therefore, a paid service that meets the requirement of the target user can be input to implement dynamic recommendation of the paid service, and the recommendation accuracy is high.

Corresponding to the foregoing embodiment of the service recommendation method, the present specification further provides an embodiment of a service recommendation apparatus and a device to which it is applied.

Figure 3:
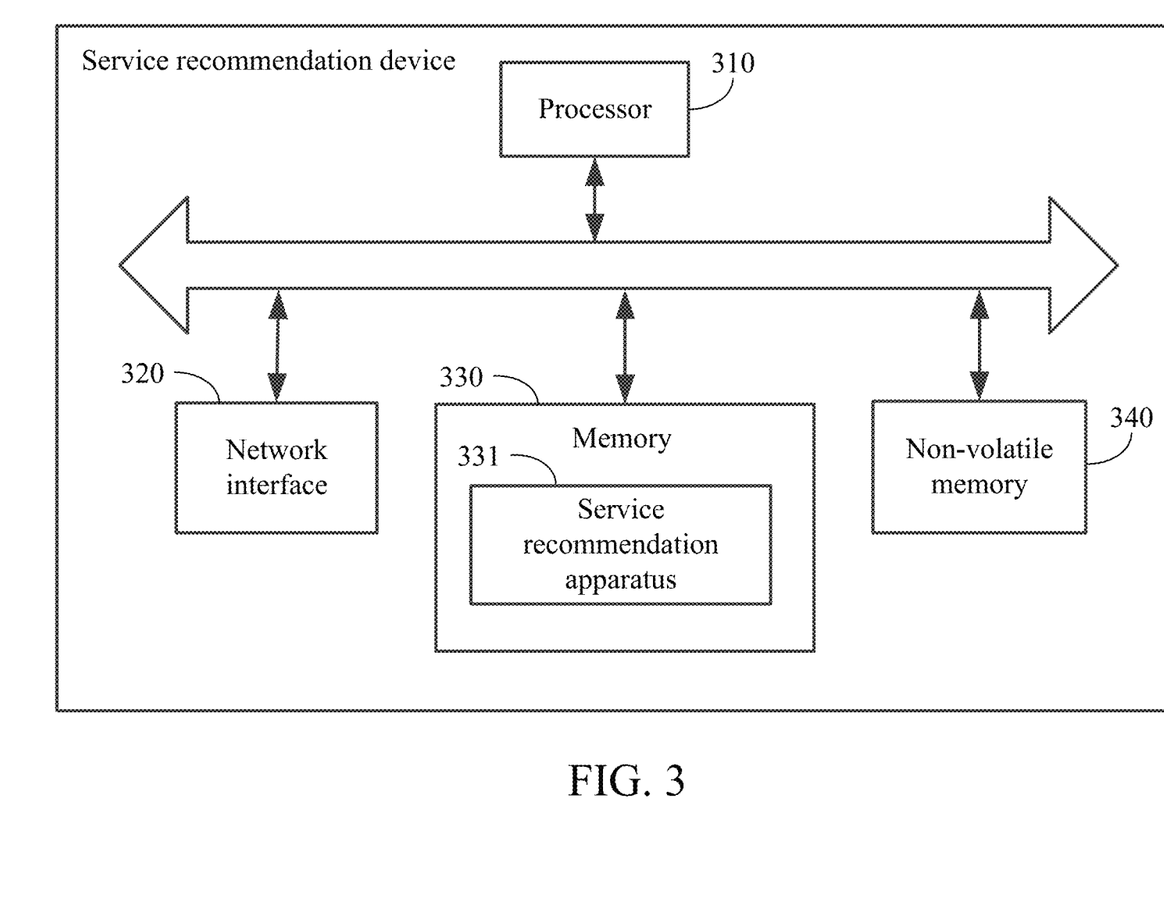
FIG. 3 is a hardware structure diagram of a computer device where a service recommendation apparatus according to an embodiment of the present specification is located.

The embodiment of the service recommendation apparatus in the present specification can be applied to a computer device, such as a server or a terminal device. The apparatus embodiment can be implemented by software, or can be implemented by hardware or a combination of software and hardware. A software implementation is used as an example, and as an apparatus in a logical sense, it is formed by reading corresponding computer program instructions in a non-volatile memory into a memory by a processor for processing files where it is located. From a hardware perspective, as shown in FIG. 3, a hardware structure diagram of a computer device where the service recommendation apparatus according to an embodiment of the present specification is located is shown. In addition to a processor 310, a memory 330, a network interface 320, and a non-volatile memory 340 shown in FIG. 3, a server or an electronic device where the apparatus 331 in the embodiment is located may also include other hardware generally according to actual functions of the computer device, which will not be repeated here.

Figure 4:
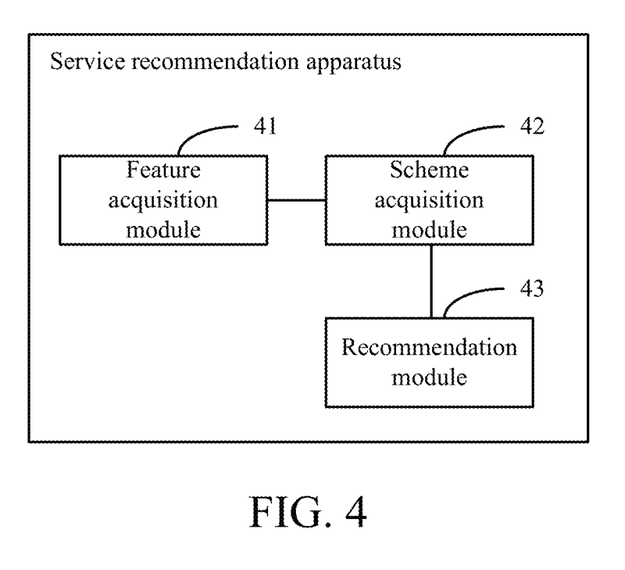
FIG. 4 is a block diagram of a service recommendation apparatus according to an exemplary embodiment of the present specification.

As shown in FIG. 4, FIG. 4 is a block diagram of a service recommendation apparatus according to an exemplary embodiment of the present specification, and the apparatus includes:

a feature acquisition module 41 configured to acquire the following features of a target user: a user feature, a use feature of the target user for a service, and a service feature of the service currently used by the target user;

a scheme acquisition module 42 configured to input the acquired features into a recommendation scheme model, and acquire a paid service recommendation scheme for the target user output by the recommendation scheme model; and a recommendation module 43 configured to perform paid service recommendation for the target user by using the paid service recommendation scheme.

Optionally, the recommendation module is specifically configured to:

output a paid recommendation entrance on a page where the target user uses the service.

Optionally, the use feature includes one or a plurality of the following:

a use time period feature, a use duration feature, a use frequency feature, a used storage space feature, or a used storage quantity feature.

Optionally, the service feature includes one or a plurality of the following:

a storage space feature, a folder quantity feature, a function type feature, a storage quantity feature, a total storage quantity feature, a computation unit peak feature, a total computation amount feature, a network download speed feature, a network upload speed feature, a total network download amount feature, or a total network upload amount feature.

Optionally, the paid service recommendation scheme includes one or a plurality of types of the following information: a paid service type, a recommendation frequency, a recommendation time, or a recommendation location.

Correspondingly, the present specification further provides a service recommendation device, including a memory, a processor, and a computer program stored in the memory and executable by the processor, wherein the processor executes the program to implement the following method:

acquiring the following features of a target user: a user feature, a use feature of the target user for a service, and a service feature of the service currently used by the target user;

inputting the acquired features into a recommendation scheme model, and acquiring a paid service recommendation scheme for the target user output by the recommendation scheme model; and performing paid service recommendation for the target user by using the paid service recommendation scheme.

For the implementation processes of the functions and roles of various modules in the above service recommendation apparatus, reference may be made to the implementation processes of the corresponding steps in the above service recommendation method, which will not be repeated here.

The apparatus embodiment is basically corresponding to the method embodiment, and therefore, for related parts, reference may be made to the part of the description of the method embodiment. The apparatus embodiment described above is only illustrative. The modules described as separate components may or may not be physically separated, and the components displayed as modules may or may not be physical modules, that is, they may be located in the same place, or they may be distributed to a plurality of network modules. Some or all of the modules may be selected according to actual needs to achieve the objective of the scheme in the present specification. Those of ordinary skill in the art can understand and implement it without creative efforts.

Figure 5:
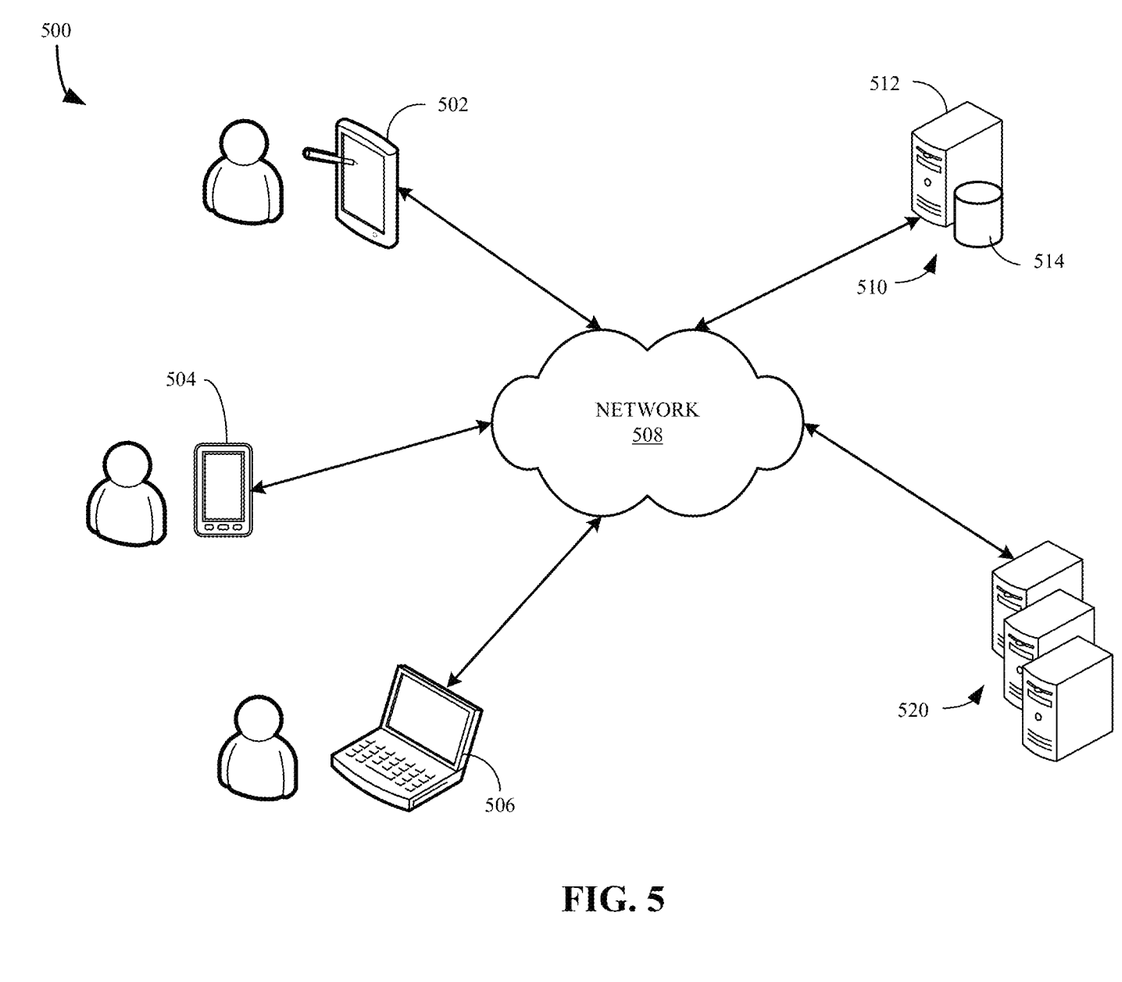
FIG. 5 illustrates an exemplary network environment for implementing the disclosed technology, in accordance with some embodiments described herein.

FIG. 5 illustrates an exemplary network environment for implementing the disclosed technology, in accordance with some embodiments described herein. A network environment 500 includes a number of electronic devices 502, 504 and 506 communicably connected to a server 510 by a network 508. One or more remote servers 520 are further coupled to the server 510 and/or the one or more electronic devices 502, 504 and 506.

In some exemplary embodiments, electronic devices 502, 504 and 506 can be computing devices such as laptop or desktop computers, smartphones, PDAs, wearable devices (e.g., smartwatches, smartglasses, etc.) portable media players, tablet computers, televisions or other displays with one or more processors coupled thereto or embedded therein, or other appropriate computing devices that can be used for displaying a web page or web application. In one example, the electronic devices 502, 504 and 506 store a user agent such as a browser or application. In the example of FIG. 5, electronic device 502 is depicted as a tablet computer, electronic device 504 is depicted as a smartphone, and electronic device 506 is depicted as a laptop computer.

Server 510 includes a processing device 512 and a data store 514. Processing device 512 executes computer instructions stored in data store 514, for example, to assist in scheduling a customer-initiated service or a service-provider-initiated service between a service provider and a customer at electronic devices 502, 504 and 506 during a service scheduling process.

In some exemplary aspects, server 510 can be a single computing device such as a computer server. In other embodiments, server 510 can represent more than one computing device working together to perform the actions of a server computer (e.g., cloud computing). The server 510 may host the web server communicably coupled to the browser at the client device (e.g., electronic devices 502, 504 or 506) via network 508. In one example, the server 510 may host a client application for scheduling a customer-initiated service or a service-provider-initiated service between a service provider and a customer during a service scheduling process. Server 510 may further be in communication with one or more remote servers 520 either through the network 508 or through another network or communication means.

The one or more remote servers 520 may perform various functionalities and/or storage capabilities described herein with regard to the server 510, either alone or in combination with server 510. Each of the one or more remote servers 520 may host various services. For example, servers 520 may host services providing information regarding one or more suggested locations such as web pages or websites associated with the suggested locations, services for determining the location of one or more users or establishments, search engines for identifying results for a user query, one or more user review or query services, or one or more other services providing information regarding one or more establishments, customers and/or reviews or feedback regarding the establishments.

Each of the one or more remote servers 520 can be a single computing device such as a computer server or can represent more than one computing device working together to perform the actions of a server computer (e.g., cloud computing). In one embodiment server 510 and one or more remote servers 520 may be implemented as a single server or a cluster of servers. In one example, server 510 and one or more remote servers 520 may communicate through the user agent at the client device (e.g., electronic devices 502, 504 or 506) via network 508.

Users may interact with the system hosted by server 510, and/or one or more services hosted by remote servers 520, through a client application installed at the electronic devices 502, 504, and 506. Alternatively, the user may interact with the system through a web-based browser application at the electronic devices 502, 504, and 506. Communication among client devices 502, 504, 506 and the system, and/or one or more services, may be facilitated through a network (e.g., network 508).

Communication among the client devices 502, 504, 506, server 510 and/or one or more remote servers 520 may be facilitated through various communication protocols. In some aspects, client devices 502, 504, 506, server 510 and/or one or more remote servers 520 may communicate wirelessly through a communication interface (not shown), which may include digital signal processing circuitry where necessary. The communication interface may provide for communications under various modes or protocols, including Global System for Mobile communication (GSM) voice calls; Short Message Service (SMS), Enhanced Messaging Service (EMS), or Multimedia Messaging Service (MMS) messaging; Code Division Multiple Access (CDMA); Time Division Multiple Access (TDMA); Personal Digital Cellular (PDC); Wideband Code Division Multiple Access (WCDMA); CDMA2000; or General Packet Radio System (GPRS), among others. For example, the communication may occur through a radio-frequency transceiver (not shown). In addition, short-range communication may occur, including via the use of a Bluetooth-enabled device, Wi-Fi®, or another such transceiver.

Network 508 can include, for example, any one or more of a personal area network (PAN), a local area network (LAN), a campus area network (CAN), a metropolitan area network (MAN), a wide area network (WAN), a broadband network (BBN), the Internet, and the like. Further, network 508 can include, but is not limited to, any one or more of the following network topologies, including a bus network, a star network, a ring network, a mesh network, a star-bus network, a tree or hierarchical network, and the like.

The foregoing describes specific embodiments of the present application. Other embodiments fall within the scope of the appended claims. In some cases, the actions or steps recited in the claims may be performed in a sequence different from the order in the embodiments and may still achieve the desired result. Further, the processes depicted in the drawings do not necessarily require the particular order or sequential order shown to achieve the desired result. In certain implementations, multitasking and parallel processing is or may be advantageous.

Those skilled in the art will easily think of other implementations of the present specification after considering the specification and practicing the invention applied here. The present specification is intended to cover any variations, uses, or adaptive changes of the present specification, and the variations, uses, or adaptive changes follow the general principles of the present specification and include common knowledge or customary technical means in the technical field not applied for in the present specification. The specification and the embodiments are only regarded as exemplary, and the true scope and spirit of the present specification are pointed out by the following claims.

It should be understood that the present specification is not limited to the precise structure described above and shown in the accompanying drawings, and various modifications and changes can be made without departing from its scope. The scope of the present specification is only limited by the appended claims.

The above descriptions are only the preferred embodiments of the present specification, and are not intended to limit the present specification. Any modification, equivalent replacement, improvement, and the like made within the spirit and principle of the present specification shall fall within the protection scope of the present specification.

What is claimed is:

1. A computer-executed method, comprising:
training, by a computer, a machine-learning model for recommending services based on sample data associated with a plurality of users and a plurality of services;
obtaining, based on historic information associated with a target user, a user feature of the target user and a service-usage feature of the target user for a target service;
inputting the user feature, the service-usage feature, and a service feature of the target service into the trained machine-learning model to determine a service recommendation scheme, wherein the trained machine-learning model outputs a recommendation location;
configuring, based on the service recommendation scheme outputted by the training machine-learning module, a user interface associated with the target service to display a service-upgrade entrance at the recommendation location;
receiving a feedback result of the target user for the service recommendation scheme; and
updating training of the machine-learning model based on the determined feedback result.

2. The method according to claim 1, wherein the trained machine-learning module further outputs one or more of:
a service type and a recommendation frequency.

3. The method according to claim 1, wherein the service-usage feature comprises one or more of:
a use time period feature, a use duration feature, a use frequency feature, a used storage space feature, and a used storage quantity feature.

4. The method according to claim 1, wherein the service feature comprises one or more of:
a storage space feature, a folder quantity feature, a function type feature, a storage quantity feature, a total storage quantity feature, a computation unit peak feature, a total computation amount feature, a network download speed feature, a network upload speed feature, a total network download amount feature, and a total network upload amount feature.

5. The method according to claim 1, wherein the machine-learning model for recommending services comprises one of: a logistic regression model, a random forest model, a Bayesian method model, a support vector machine model, and a neural network model.

6. A computer system, comprising:
a processor;
a storage device coupled to the processor and storing instructions, which when executed by the processor cause the processor to perform a method, the method comprising:
training, by a computer, a machine-learning model for recommending services based on sample data associated with a plurality of users and a plurality of services;

obtaining, based on historic information associated with a target user, a user feature of the target user and a service-usage feature of the target user for a target service;

inputting the user feature, the service-usage feature, and a service feature of the target service into the trained machine-learning model to determine a service recommendation scheme, wherein the trained machine-learning model outputs a recommendation location;

configuring, based on the service recommendation scheme outputted by the training machine-learning module, a user interface associated with the target service to display a service-upgrade entrance at the recommendation location;

receiving a feedback result of the target user for the service recommendation scheme; and updating training of the machine-learning model based on the determined feedback result.

7. The computer system according to claim 6, wherein the trained machine-learning module further outputs one or more of:

a service type and a recommendation frequency.

8. The computer system according to claim 6, wherein the service-usage feature comprises one or more of:

a use time period feature, a use duration feature, a use frequency feature, a used storage space feature, and a used storage quantity feature.

9. The computer system according to claim 6, wherein the service feature comprises one or more of:

a storage space feature, a folder quantity feature, a function type feature, a storage quantity feature, a total storage quantity feature, a computation unit peak feature, a total computation amount feature, a network download speed feature, a network upload speed feature, a total network download amount feature, and a total network upload amount feature.

10. The computer system according to claim 6, wherein the machine-learning model for recommending services comprises one of: a logistic regression model, a random forest model, a Bayesian method model, a support vector machine model, and a neural network model.

11. A non-transitory computer-readable storage 2 medium storing instructions that when executed by a computer cause the computer to perform a method, the method comprising:

training, by a computer, a machine-learning model for recommending services based on sample data associated with a plurality of users and a plurality of services;

obtaining, based on historic information associated with a target user, a user feature of the target user and a service-usage feature of the target user for a target service;

inputting the user feature, the service-usage feature, and a service feature of the target service into the trained machine-learning model to determine a service recommendation scheme, wherein the trained machine-learning model outputs a recommendation location;

configuring, based on the service recommendation scheme outputted by the training machine-learning module, a user interface associated with the target service to display a service-upgrade entrance at the recommendation location;

receiving a feedback result of the target user for the service recommendation scheme; and updating training of the machine-learning model based on the determined feedback result.

12. The non-transitory computer-readable storage medium according to claim 11, wherein the trained machine-learning module further outputs one or more of:

a service type and a recommendation frequency.

13. The non-transitory computer-readable storage medium 2 according to claim 11, wherein the service-usage feature comprises one or more of:

a use time period feature, a use duration feature, a use frequency feature, a used storage space feature, and a used storage quantity feature.

14. The non-transitory computer-readable storage medium according to claim 11, wherein the service feature comprises one or more of:

a storage space feature, a folder quantity feature, a function type feature, a storage quantity feature, a total storage quantity feature, a computation unit peak feature, a total computation amount feature, a network download speed feature, a network upload speed feature, a total network download amount feature, and a total network upload amount feature.

15. The non-transitory computer-readable storage medium according to claim 11, wherein the machine-learning model for recommending services comprises one of: a logistic regression model, a random forest model, a Bayesian method model, a support vector machine model, and a neural network model.

* * * * *

UNITED STATES PATENT AND TRADEMARK OFFICE
CERTIFICATE OF CORRECTION

| | | |
|---|---|---|
| PATENT NO. | : 11,222,273 B2 | Page 1 of 1 |
| APPLICATION NO. | : 17/157881 | |
| DATED | : January 11, 2022 | |
| INVENTOR(S) | : Lindong Liu | |

It is certified that error appears in the above-identified patent and that said Letters Patent is hereby corrected as shown below:

In the Claims

Claim 1, Column 12, Line 29-30 "training machine-learning module," should read "trained machine-learning model,"
Claim 6, Column 13, Line 17 "the determined feedback result." should read "the feedback result."
Claim 11, Column 14, Line 12-13 "scheme outputted by the training machine-learning module," should read "scheme outputted by the trained machine-learning model,"
Claim 11, Column 13, Line 41 "2" should be deleted
Claim 12, Column 14, Line 22 "learning module further outputs one or more of:" should read "learning model further outputs one or more of:"
Claim 13, Column 14, Line 25 "2" should be deleted Signed and Sealed this
Tenth Day of May, 2022

Katherine Kelly Vidal
*Director of the United States Patent and Trademark Office*